(12) United States Patent
Naka et al.

(10) Patent No.: US 8,517,681 B2
(45) Date of Patent: Aug. 27, 2013

(54) WIND TURBINE BLADE AND WIND TURBINE GENERATOR HAVING THE SAME

(75) Inventors: Takehiro Naka, Tokyo (JP); Takatoshi Matsushita, Tokyo (JP); Nobuyasu Nakamura, Tokyo (JP); Yoshihiko Hayashi, Tokyo (JP); Shinji Arinaga, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 16 days.

(21) Appl. No.: 13/027,730

(22) Filed: Feb. 15, 2011

(65) Prior Publication Data

US 2011/0182731 A1 Jul. 28, 2011

Related U.S. Application Data

(63) Continuation of application No. PCT/JP2010/072213, filed on Dec. 10, 2010.

(30) Foreign Application Priority Data

Dec. 24, 2009 (JP) .................................. 2009-292398
Dec. 24, 2009 (JP) .................................. 2009-292461

(51) Int. Cl.
*F03D 9/00* (2006.01)
(52) U.S. Cl.
USPC .......... 416/1; 416/146 R; 416/229 R; 416/230
(58) Field of Classification Search
USPC ............... 415/18; 416/27, 32, 37, 62, 146 R, 416/224, 229 R, 230, 241 R, 1; 361/117, 361/218; 290/44, 55; 324/72
See application file for complete search history.

(56) References Cited

U.S. PATENT DOCUMENTS

| | | | |
|---|---|---|---|
| 7,040,864 B2 * | 5/2006 | Johansen et al. | 416/146 R |
| 7,508,186 B2 | 3/2009 | Mortensen | |
| 8,177,509 B2 * | 5/2012 | Hansen | 416/146 R |
| 8,182,227 B2 * | 5/2012 | Jacobsen et al. | 416/146 R |
| 8,342,805 B2 * | 1/2013 | Mendez Hernandez et al. | 416/146 R |
| 2006/0126252 A1 | 6/2006 | Mortensen | |
| 2006/0280613 A1 * | 12/2006 | Hansen | 416/230 |

(Continued)

FOREIGN PATENT DOCUMENTS

| | | | |
|---|---|---|---|
| EP | 0707145 | * | 4/1996 |
| EP | 0707145 A1 | | 4/1996 |

(Continued)

OTHER PUBLICATIONS

Boehmeke, Lightning Protection for Wind Turbine, Apr. 17, 1996, Abstract of EP0707145.*

(Continued)

*Primary Examiner* — Edward Look
*Assistant Examiner* — Liam McDowell
(74) *Attorney, Agent, or Firm* — Manabu Kanesaka; Kenneth M. Berner; Benjamin J. Hauptman

(57) ABSTRACT

A wind turbine blade has a blade body 11, a plurality of receptors 12, 13 embedded in and exposed to the surface of the blade body 11, a conductor layer 14 provided on the surface of the blade body 11 and connecting the receptors 12, 13 with one another and a downconductor 21 connected to the receptors 12, 13 and provided in the blade body 11. The downconductor 21 may be embedded in an insulator.

18 Claims, 9 Drawing Sheets

(56) References Cited

U.S. PATENT DOCUMENTS

| | | |
|---|---|---|
| 2008/0095624 A1* | 4/2008 | Lewke ................. 416/146 R |
| 2008/0181775 A1* | 7/2008 | Livingston et al. ............. 416/95 |
| 2009/0053062 A1 | 2/2009 | Arinaga et al. |
| 2009/0139739 A1 | 6/2009 | Hansen |
| 2009/0246025 A1* | 10/2009 | Lewke et al. ............. 416/146 R |
| 2011/0020134 A1* | 1/2011 | Jensen et al. ............. 416/241 R |
| 2012/0243997 A1* | 9/2012 | Olsen ................. 416/146 R |

FOREIGN PATENT DOCUMENTS

| | | | |
|---|---|---|---|
| JP | 2006-052719 | * | 2/2006 |
| JP | 2006-127820 | * | 5/2006 |
| JP | 2007-100658 | | 4/2007 |
| JP | 2007-120393 | | 5/2007 |
| JP | 2007-170268 | | 7/2007 |
| JP | 2008-115783 | | 5/2008 |
| JP | 2009-250040 | | 10/2009 |
| WO | WO94/25752 | * | 11/1994 |
| WO | WO 2009-080048 A2 | | 7/2009 |

OTHER PUBLICATIONS

Hanai, Wind Power Generation Device and Blade, Feb. 23, 2006, Abstract of JP2006-052719.*

Aeba, Lightning Arrester, May 18, 2006, Abstract of JP2006-127820.*

PCT, International Preliminary Report on Patentability, Aug. 14, 2012.

Australian Patent Office, "Patent Examination Report No. 1 for Australian Application No. 2010336835", Dec. 5, 2012.

European Patent Office, "Extended European Search Report for EP 10 83 9204", May 14, 2013.

* cited by examiner

US 8,517,681 B2

WIND TURBINE BLADE AND WIND TURBINE GENERATOR HAVING THE SAME

RELATED APPLICATIONS

The present application is continuation from National Phase of International Application No. PCT/JP2010/072213 filed Dec. 10, 2010, and claims priority from Japanese Applications No. 2009-292398, filed Dec. 24, 2009 and No. 2009-292461, filed Dec. 24, 2009, the disclosure of which is hereby incorporated by reference herein in its entirety.

BACKGROUND OF THE INVENTION

1. Field of the Invention

The present invention relates to a wind turbine blade and a wind turbine generator having the blade and in particular to a wind turbine blade which is protected from lightning strikes and a wind turbine generator having the blade.

2. Description of the Related Art

In general, a lightening protection system of a wind turbine blade is configured such that lightning strike is captured in a plurality of receptors (metallic lightening receiving section) mounted on a blade surface, and lightening current is conducted to the ground through the inside of the blade, a rotor hub, a nacelle and a tower by means of a downconductor connected to the receptors. There are many types of receptors such as a circular receptor, a rod receptor, and a blade-type receptor. Further, conductive tapes, conductive meshes and conductive diverter strips (metal pieces mounted discontinuously on the blade surface) can be used as the receptors.

FIG. 1A is a schematic view showing an exemplary structure of a wind turbine blade having a common lightening protection system. The wind turbine blade 101 has a rod receptor 112 embedded in a tip of the blade body 111, disk receptors 113 embedded in the blade, downconductors 121 (a leading edge receptor and a trailing edge receptor) which are connected to the rod receptor 112 and the disk receptors 113 and installed across the inner space of the blade body 111. As shown in FIG. 1B, the disk receptors 113 includes, for instance, a conductive circular disk 131 and a wire 133 for connecting the disk 131 and the downconductors 121. When lightning strikes the receptors (112, 113), the lightning is conducted to the ground from the receptors through the downconductors, the inner space of the blade, the rotor hub, the nacelle and the tower.

A method of registering lightning strike in the blade of a wind turbine is disclosed in U.S. Pat. No. 7,508,186. A wind turbine generator as described in U.S. Pat. No. 7,508,186 includes receptors mounted in several places on the blade surface. The receptors are earthed to the ground via a conductive wire in the blade.

A lightning protection device of a wind turbine blade and a method of assembling the lightning protection device are disclosed in US2009/0053062. The lightning protection device has a tip receptor assembly and an intermediate receptor assembly. The tip receptor assembly has receptors which are mounted, in particular to, the tip end part of the blade where the blade profile becomes smaller, and has a simple structure so as to be readily assembled. The intermediate receptor assembly has a receptor which is set at the outer surface of the blade so as to exhibit an effective countermeasure against increasing of the air pressure in the blade upon a lightning striking the blade. The lightning current is discharged to the ground from the receptors through connection equipment such as lead wires laid through the inside of the blade, the windmill body and bypass brushes. A base plate made of an electrically conductive material and connected to the wires is embedded in the blade, and receptors are secured and supported to the base plate.

RELATED ART DOCUMENT

Patent Document

[PATENT DOCUMENT 1] U.S. Pat. No. 7,508,186 B
[PATENT DOCUMENT 2] US 2009/0053061 A

SUMMARY OF THE INVENTION

Object to be Achieved

The receptors can almost certainly capture lightning strikes near the tip of the blade. FIG. 1A shows the lightning 150 striking the rod receptor 112 at the tip of the blade. However, the circular receptors do not have a high rate of capturing lightning strikes that hit about a few meters away from the blade tip toward the blade root. In some cases, lightning strikes the outer shell made of an insulator, possibly causing damages such as making a hole in the blade. FIG. 1A shows lightning 151 striking the place where the disk receptors 113 are not installed and making a hole 140 in the blade body 111.

A wind turbine generator is desired to be larger, which accompanies a longer blade. In such a case of installing a wind turbine generator off shore, salt deposit on the blade surface or the like causes creeping discharge in which lightning runs along the blade surface. This may reduce a rate of capturing lightning strikes overall. This increases the risk of lightning striking places other than the blade tip and the receptors.

Therefore, it is an object of the present invention to provide a wind turbine blade which is capable of preventing damages of the blade body caused by lightning strikes, and a wind turbine generator having the wind turbine blade. It is another object of the present invention is to provide a wind turbine blade which is capable of improving the rate of capturing lightning strikes and also preventing damages of the blade body caused by lightning strikes, and a wind turbine generator having the wind turbine blade.

Means to Solve the Issues

Means to solve the issues are explained hereinafter using reference numbers and codes used in modes for carrying out the invention. The reference numbers and codes are shown in parentheses to explain correspondence relationships between the description in the scope of the claims and preferred embodiments of the present invention. However, the reference numbers and codes used here should not be used to understand the scope of the claims.

The wind turbine blade of an aspect of the present invention has a blade body (11), a plurality of receptors (12, 13), a conductor layer (14) and a downconductor (21). The plurality of receptors (12, 13) are embedded in the blade body (11) and exposed on a surface of the blade body (11). The conductor layer (14) is provided on the surface of the blade body and connects the plurality of receptors (12, 13) one another. The downconductor (21) is connected to the plurality of receptors (12, 13) and provided in the blade body (11).

According to the aspect of the present invention, the conductor layer (14) is provided on the surface of the blade body. This substantially achieves a larger area of the receptors (12, 13). The area of capturing lightning strikes can be increased by the above method which can be created simply. As a result, it is possible to improve the rate of capturing lightning strikes by the receptors (12, 13).

In the above wind turbine blade, the conductor layer (14) is at least one selected from a group of a conductive tape, a conductive mesh, a conductive foil and a conductive diverter strip.

By using the conductive tape or the like, the conductor layer (14) can be manufactured by a very simple method.

In the above wind turbine blade, the conductor layer (14) is formed in a continuous manner from an upwind side of the blade body (11) through a leading edge to a downwind side of the blade body (11).

In the aspect of the present invention, the conductor layer (14) can be arranged on the leading edge part where it is difficult to arrange receptors (12, 13), and thus, the substantive area of the receptors (12, 13) can be enlarged, thereby achieving the higher rate of capturing lightning strikes.

In the above wind turbine blade, each of the plurality of receptors (12, 13) has a receptor body (31) having a face formed along the surface of the blade body (11) and a convex portion (32a, 32b, 32c) disposed on the face of the receptor body.

In the aspect of the present invention, each of the plurality of receptors (12, 13) has the convex portion (32a, 32b, 32c) disposed on the face of the receptor body. By providing the conductive protruding member with a sharp end, a concentration ratio of lightning strikes around the receptor (12, 13) can be enhanced. As a result, it is possible to promote the progression of leader-streamer extending toward thunder clouds from the receptor. Specifically, it is possible to improve the rate of capturing lightning strikes by the receptor (12, 13).

In the above wind turbine blade, the convex portion (32a, 32b, 32c) of the receptor is at least one selected from a group of an acicular conductor, a conical conductor, a cylindrical conductor and a prismatic conductor.

In the aspect of the present invention, by using a projecting object having a sharp tip such as the acicular conductor as the convex portion (32a, 32b, 32c), the rate of capturing lightning strikes by the receptor (12, 13) can be firmly improved.

The above wind turbine blade also has a photocatalyst (29). The photocatalyst (29) is applied to the surface of the blade body (11) and cleanses the surface of the blade body (11).

In the aspect of the present invention, the photocatalyst (29) is provided on the outside of the blade body (11), resulting in preventing contamination on the surface of the blade body (11) and creeping discharge. As a result, the rate of capturing lightning strikes by the receptors (12, 13) can be improved.

A wind turbine generator of one aspect of the present invention has the above-described wind turbine blade. This wind turbine generator has a nacelle (72) mounted rotatably on a support, a rotor head (71) which is connected rotatably to the nacelle (72) and first, second and third wind turbine blades (61, 62, 63). Each of the first, second and third wind turbine blades (61, 62, 63) is constituted of the wind turbine blade. The first wind turbine blade (61) has a tip part (61a) which is additionally processed for lightning protection. In response to approaching of lightning, the first to third wind turbine blades (61, 62, 63) are feathered and stopped in such a position that the first wind turbine blade (61) is positioned upright.

In the aspect of the present invention, in response to approaching of lightning, all of the blades are feathered and kept in the position where the first wind turbine blade (61) is positioned upright. By this, the part (the tip part 61a) of the first wind turbine blade (61) where the lightning protection is reinforced (additionally processed), can be directed toward the direction of approaching lightning. As a result, the rate of capturing lightning strikes by the processed parts of the receptors (12, 13) can be improved. Meanwhile, other parts of the blades can be processed normally for lightning protection. Therefore, in comparison to the case of processing all of the blades the same lightning protection, the lightning protection can be lower cost and more effective.

In the above wind turbine generator, the second wind turbine blade (62) has a upwind-side part (62a) which is additionally processed for lightning protection and the third wind turbine blade (63) has a downwind-side part (63a) which is additionally processed for lightning protection. In response to approaching of lightning, the second and third wind turbine blades (62, 63) are stopped in such a position that the upwind part of the second wind turbine blade (62) faces upward and the downwind part of the third wind turbine blade (63) faces upward.

In the aspect of the present invention, the second and third wind turbine blades (62, 63) are respectively kept in the position where the upwind part of the second wind turbine blade (62) faces upward and the downwind part of the third wind turbine blade (63) faces upward. By this, the parts (the tip part 61a, the upwind part 62a and the downwind part 63a) processed for lightning protection of each of the first to third wind turbine blades (61, 62, 63) can be positioned toward the direction of approaching lightning. As a result, the rate of capturing lightning strikes by the processed parts of the receptors (12, 13) can be improved. Meanwhile, other parts of the blades can be processed normally for lightning protection. Therefore, in comparison to the case of processing all of the blades the same lightning protection, the lightning protection can be lower cost and more effective.

In the above wind turbine generator, each of the first to third wind turbine blades (61m 62, 63) has the blade body (11), the receptors (12, 13) which are embedded in the blade body (11), the conductor layer (14) which is provided on the surface of the blade body and connects the receptors (12, 13) one another, and the downconductor (21) which is connected to the receptors (12, 13) and provided in the blade body (11). Each of the tip part (61a) of the first wind turbine blade (61), the upwind part (62a) of the second wind turbine blade (62) and the downwind part (63a) of the third wind turbine blade (63) has a bigger receptor or more receptors of the plurality of receptors than other area of said each blade.

In the aspect of the present invention, as an additional measure for lightning protection, the size of the receptors (12, 13) is made bigger or the number of the receptors (12, 13) is increased. Thus, the rate of capturing lightning strikes by the receptors (12, 13) located in the above parts can be improved.

In the above wind turbine generator, each of the first to third wind turbine blades (61, 62, 63) has the blade body (11), the receptors (12, 13) which are embedded in the blade body (11), the conductor layer (14) which is provided on the surface of the blade body and connects the receptors (12, 13) one another, and the downconductor (21) which is connected to the receptors (12, 13) and provided in the blade body (11). The conductor layer (14) is provided on a surface of the blade body (11) in each of the tip part (61a) of the first wind turbine blade (61), the upwind part (62a) of the second wind turbine blade (62) and the downwind part (63a) of the third wind turbine blade (63).

In the aspect of the present invention, the conductor layer (14) is provided on the surface of the blade body (11) in each of the first to third wind turbine blades (61, 62, 63). As a result, the substantive area of the receptors (12, 13) can be enlarged, thereby achieving the higher rate of capturing lightning strikes.

In the above wind turbine generator, each of the first to third wind turbine blades (61, 62, 63) has the blade body (11), the receptors (12, 13) which are embedded in the blade body (11), the conductor layer (14) which is provided on the surface of the blade body and connects the receptors (12, 13) one another, and the downconductor (21) which is connected to the receptors (12, 13) and provided in the blade body (11).

The downconductor (21) is embedded in an insulator (23, 25) in each of the tip part (61*a*) of the first wind turbine blade (61), the upwind part (62*a*) of the second wind turbine blade (62) and the downwind part (63*a*) of the third wind turbine blade (63).

In the aspect of the present invention, as an additional measure for lightning protection, the downconductor (21) is embedded in the insulator (23, 25). Thus, the rate of lightning striking the downconductor (21) can be reduced. As a result, lightning tends to strike the receptors (12, 13) near the downconductor (21) instead of the downconductor (21) itself. This improves the rate of capturing lightning strikes by the receptors (12, 13).

In the above wind turbine generator, each of the first to third wind turbine blades (61, 62, 63) has the blade body (11), the receptors (12, 13) which are embedded in the blade body (11), the conductor layer (14) which is provided on the surface of the blade body and connects the receptors (12, 13) one another, and the downconductor (21) which is connected to the receptors (12, 13) and provided in the blade body (11).

The connection part (35) with a wire (33) connecting the receptors (12, 13) to the downconductor (21) is formed smooth in each of the tip part (61*a*) of the first wind turbine blade (61), the upwind part (62*a*) of the second wind turbine blade (62) and the downwind part (63*a*) of the third wind turbine blade (63).

In the aspect of the present invention, as an additional measure for lightning protection, the connection part (35) connecting the wire (33) and the downconductor (21) is formed smooth with fewer convex spots on the surface and small concentration of electric field. This reduces the probability of lightning striking the connection part (35). As a result, lightning is likely to strike the receptors (12, 13) arranged near the connection part (35) instead of the connection part (35) itself. Specifically, it is possible to improve the rate of capturing lightning strikes by the receptors (12, 13).

In the above wind turbine generator, each of the first to third wind turbine blades (61, 62, 63) has the blade body (11), the receptors (12, 13) which are embedded in the blade body (11), the conductor layer (14) which is provided on the surface of the blade body and connects the receptors (12, 13) one another, and the downconductor (21) which is connected to the receptors (12, 13) and provided in the blade body (11).

The downconductor (21) is shared between the plurality of first receptors (12, 13) and the plurality of second receptors (12, 13) in each of the tip part (61*a*) of the first wind turbine blade (61), the upwind part (62*a*) of the second wind turbine blade (62) and the downwind part (63*a*) of the third wind turbine blade (63).

In the aspect of the present invention, one common downconductor (21) is provided and shared between the receptors (12, 13) on the leading edge side and the receptors (12, 13) on the trailing edge side. By reducing the number of downconductors (21) that may be struck by lightning, the probability of lightning striking the downconductor (21) decreases. As a result, lightning tends to strike the receptors near the downconductor (21) instead of the downconductor (21) itself. This improves the rate of capturing lightning strikes by the receptors (12, 13).

In the above wind turbine generator, each of the first to third wind turbine blades (61, 62, 63) has the blade body (11), the receptors (12, 13) which are embedded in the blade body (11), the conductor layer (14) which is provided on the surface of the blade body and connects the receptors (12, 13) one another, and the downconductor (21) which is connected to the receptors (12, 13) and provided in the blade body (11). Each of receptors (12, 13) that are provided in each of the tip part (61*a*) of the first wind turbine blade (61), the upwind part (62*a*) of the second wind turbine blade (62) and the downwind part (63*a*) of the third wind turbine blade (63) has a receptor body (31) having a face formed along the surface of the blade body (11) and a convex portion (32*a*, 32*b*, 32*c*) disposed on the face of the receptor body (31).

In the aspect of the present invention, as an additional measure for lightning protection, a protruding conductor with a sharp tip such as the convex portion (32*a*, 32*b*, 32*c*) is provided in the receptors (12, 13) and thus, the concentration of electrical field at the receptors (12, 13) is improved. This promotes the progression of leader-streamer extending toward thunder clouds from the receptor. Specifically, it is possible to improve the rate of capturing lightning strikes by the receptors (12, 13).

In the above wind turbine generator, each of the first to third wind turbine blades (61, 62, 63) has the blade body (11), the receptors (12, 13) which are embedded in the blade body (11), the conductor layer (14) which is provided on the surface of the blade body and connects the receptors (12, 13) one another, and the downconductor (21) which is connected to the receptors (12, 13) and provided in the blade body (11). Each of the tip part (61*a*) of the first wind turbine blade (61), the upwind part (62*a*) of the second wind turbine blade (62) and the downwind part (63*a*) of the third wind turbine blade (63) has a drying unit (26, 28) which dries the inside of the blade body (11).

In the aspect of the present invention, as an additional measure for lightning protection, the drying unit (26, 28) is provided inside of the blade body (11) and thus, the moisture inside the blade body (11) can be kept low. As a result, it is possible to prevent pressure rise such as vapor explosion caused by sudden temperature rise of moisture inside of the blade body (11) in the event of lightning strike. By this, the damages of the wind turbine blade (11) caused by the pressure rise and vapor explosion can be prevented.

In the above wind turbine generator, each of the first to third wind turbine blades (61, 62, 63) has the blade body (11), the receptors (12, 13) which are embedded in the blade body (11), the conductor layer (14) which is provided on the surface of the blade body and connects the receptors (12, 13) one another, and the downconductor (21) which is connected to the receptors (12, 13) and provided in the blade body (11). Each of the tip part (61*a*) of the first wind turbine blade (61), the upwind part (62*a*) of the second wind turbine blade (62) and the downwind part (63*a*) of the third wind turbine blade (63) has a photocatalyst (29) which is applied to the surface of the blade body and cleanses the surface of the blade body (11).

In the aspect of the present invention, as an additional measure for lightning protection, the photocatalyst (29) is provided on the outside of the blade body (11). Therefore it is possible to prevent contamination on the surface of the blade body (11) and creeping discharge As a result, the rate of capturing lightning strikes by the receptors (12, 13) can be improved.

A wind turbine generator of an aspect of the present invention has the wind turbine blade as described in one of the above paragraphs.

In the aspect of the present invention, the wind turbine using at least one of the art described in the above paragraph, and thus, it is possible to handle lightning strikes accordingly and also to significantly suppress the damages of the wind turbine blade caused by lightning strikes.

A wind turbine generator of an aspect of the present invention may include, but is not limited to, a blade body (11), a plurality of first receptors (12, 13) which are embedded in a leading edge side of the blade body and exposed on a surface of the blade body, a plurality of second receptors (12, 13) which are embedded in a trailing-edge side of the blade body and exposed on the surface of the blade body, and a downconductor (21) which is connected to the first receptors (12, 13) and the second receptors (12, 13) and provided in the blade body. The downconductor (21) is shared between the first receptors and the second receptors (12, 13).

In the aspect of the present invention, one common downconductor (21) is used for both the receptors (12, 13) on the leading edge side and the receptors (12, 13) on the trailing edge side. Thus, it is possible to reduce the number of downconductors (21) that may be struck by lightning, thereby reducing the probability of lightning striking the downconductor (21). As a result, lightning tends to strike the receptors near the downconductor (21) instead of the downconductor (21) itself. This improves the rate of capturing lightning strikes by the receptors (12, 13).

In the above wind turbine blade, the downconductor (21) is connected to the receptors (12, 13) and provided in the wind turbine blade (11). The downconductor (21) is embedded in an insulator (23, 25).

By embedding the downconductor (21) in the insulator (23, 25), the probability of lightning striking the downconductor (21) can be reduced. As a result, lightning is likely to strike the receptors (12, 13) near the downconductor (21) instead of the downconductor (21) itself. Specifically, it is possible to improve the rate of capturing lightning strikes by the receptors (12, 13).

In the above wind turbine blade, the insulator (23, 25) may be one of an insulating covering member (23) which covers a conductor line of the downconductor and an insulating material (25) which fills a prescribed space surrounding the downconductor (21).

According to the aspect of the present invention, it is possible to protect the downconductor (21) with a very simple method such as covering with the insulating covering member (23) and the filling with the insulating material (25).

In the above wind turbine blade, a connection part where the downconductor (21) and wire (33) from the first receptor or the second receptor (12, 13) are connected, is formed smooth.

According to the aspect of the invention, the connection part (35) connecting the wire (33) and the downconductor (21) is formed smooth with fewer convex spots on the surface. This reduces the probability of lightning striking the connection part (35). As a result, lightning is likely to strike the receptors (12, 13) arranged near the connection part (35) instead of the connection part (35) itself. Specifically, it is possible to improve the rate of capturing lightning strikes by the first or second receptors (12, 13).

In the above wind turbine blade, a drying unit (26, 28) is provided inside of the blade body (11) and dries the inside of the blade body (11).

By providing the drying unit (26, 28) in the blade body (11), the moisture inside the blade body (11) can be kept low.

As a result, it is possible to prevent pressure rise such as vapor explosion caused by sudden temperature rise of moisture inside of the blade body (11) in the event of lightning strike. By this, the damages of the wind turbine blade (11) caused by the pressure rise and vapor explosion can be prevented.

In the above wind turbine blade, the drying unit (26) is one of a desiccant agent (26) which is installed in the blade body (11) and a dehumidifying device (28) which is installed in the blade body.

With the structure in which the drying unit (26) such as the desiccant agent (26) and the dehumidifying device (28) can be easily arranged, the damages of the wind turbine blade (11) caused by the pressure rise and vapor explosion can be prevented.

In a wind turbine generator of an aspect of the present invention has the wind turbine blade as described in any one of the above paragraphs.

In the aspect of the present invention, the wind turbine using at least one of the art described in the above paragraph, and thus, it is possible to handle lightning strikes accordingly and also to significantly suppress the damages of the wind turbine blade caused by lightning strikes.

In an operation method of a wind turbine generator of an aspect of the present invention, the wind turbine generator (60) may include, but is not limited to a nacelle (72) mounted rotatably on a support, a rotor head (71) which is connected rotatably to the nacelle (72), and first, second and third wind turbine blades (61, 62, 63) each of which is provided on the rotor head (71) and capable of feathering. The first wind turbine blade (61) has a tip part (61a) which is additionally processed for lightning protection. The second wind turbine blade (62) has an upwind part which is additionally processed for lightning protection. The third wind turbine blade (63) has a downwind part (63a) which is additionally processed for lightning protection. The operation method of the wind turbine generator may include, but is not limited to the steps of: feathering the first to third wind turbine blades (61, 62, 63) in response to approaching of lightning; and stopping the first to third wind turbine blades (61, 62, 63) in such a position that the first wind turbine blade (61) is positioned upright, the upwind side of the second wind turbine bade (62) faces upward and the downwind side of the third wind turbine blade (63) faces upward.

In the aspect of the present invention, in response to approaching of lightning, all of the blades are feathered and kept in the position where the first wind turbine blade (61) is positioned upright, the upwind part of the second wind turbine blade (62) faces upward and the downwind part of the third wind turbine blade (63) faces upward. By this, the parts (the tip part 61a, the upwind part 62a and the downwind part 63a) processed for lightning protection of each of the first to third wind turbine blades (61, 62, 63) can be positioned toward the direction of approaching lightning. As a result, the rate of capturing lightning strikes by the processed parts of the receptors (12, 13) can be improved. Meanwhile, other parts of the blades can be processed normally for lightning protection. Therefore, in comparison to the case of processing all of the blades the same lightning protection, the lightning protection can be lower cost and more effective.

The above operation method of the wind turbine generator may also include the step of positioning the rotor head so as to face a direction of the lightning.

By yawing the wind turbine generator to follow the direction of lightning cloud instead of the direction of the wind direction. The rate of capturing lightning strikes by the receptors (12, 13) can be firmly improved.

Effects of the Invention

According to the present invention, it is possible to provide a wind turbine blade which is capable of preventing damages of the blade body caused by lightning strikes, and a wind turbine generator having the wind turbine blade. It is also possible to provide a wind turbine blade which is capable of improving the rate of capturing lightning strikes and also preventing damages of the blade body caused by lightning strikes, and a wind turbine generator having the wind turbine blade.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

In reference to the attached drawings, preferred embodiments of a wind turbine blade and a wind turbine generator having the wind turbine blade are described hereinafter.

First Preferred Embodiment

A wind turbine blade in relation to a first preferred embodiment of the present invention is described in reference to the attached drawings. The wind turbine blade of the first preferred embodiment has an external conductor layer on a surface of an outer shell. It is described in detail below.

Figure 2A:
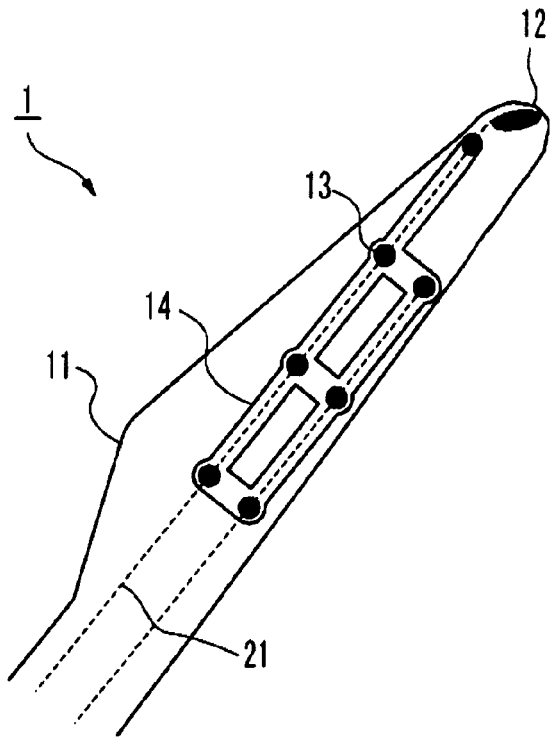
FIG. 2A A schematic view showing a structure of a wind turbine blade in relation to a first preferred embodiment of the present invention.

FIG. 2A is a schematic view showing a structure of a wind turbine blade in relation to the first preferred embodiment of the present invention. The wind turbine blade 1 has a blade body 11, a rod receptor 12, a plurality of disk receptors 13, a conductor layer 14 and downconductors 21. The rod receptor 12 is embedded in a tip part of the blade body 11 to be exposed on the surface of the blade body 11. The disk receptors 13 are embedded in the blade body 11 on its tip side to be exposed on the surface of the blade body 11. The external conductor layer 14 is provided in the areas around the disk receptors 13 and the rod receptor 12 on the surface of the blade body 11. The external conductor layer connects the adjacent receptors of the disk receptors 13 and the rod receptor 12 to one another. The downconductors 21 (for the receptors on a leading edge side and for the receptors on a trailing edge side) is connected to the plurality of disk receptors and the rod receptor 12 and installed across the inside of the blade body 11. In such a case that the wind turbine blade 1 is mounted on a wind turbine generator, when the receptors (12, 13) is struck by lightning, lightening current is conducted to the ground through the inside of the blade, a rotor hub, a nacelle and a tower by means of the downconductor connected to the receptors.

The external conductor layer 14 is a conductive material covering the surface of the outer shell of the blade body 11. The external conductor layer 14 functions as a receptor as well as a conductor from a point where lightning strikes to the disk receptors 13 and the rod receptor 12. The external conductor layer 14 is preferably thin and light-weight so that it does not affect the operation of the wind turbine blade 1 without causing noise or reducing the rotation efficiency when being installed on the outer shell surface of the blade body.

The external conductor layer 14 can be formed by forming into a prescribed shape at least one, for instance, of a conductive tape, a conductive mesh, a conductive foil and a conductive diverter strip and then applied to the surface of the outer shell of the blade body 11. Alternatively, diverter strips formed into a prescribed shape may be applied to the surface of the outer shell, for instance. It is also possible to form the external conductor layer 14 by combining some of the conductive tape, the conductive mesh, the conductive foil and the diverter strips.

Figure 1A:
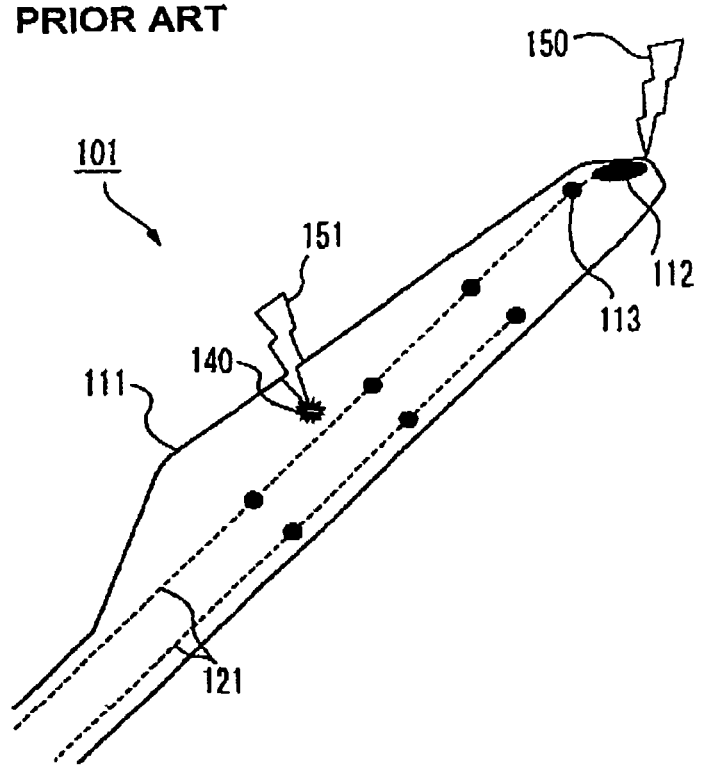
FIG. 1A A view showing one example of a common wind turbine blade which is processed for lightning protection.
Figure 1B:
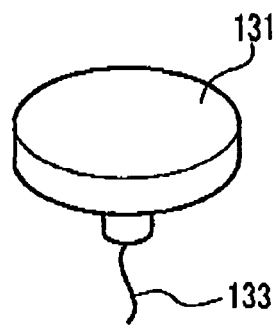
FIG. 1B A schematic view showing a structure of a disk receptor of FIG. 1A.

The disk receptors 13 are the same as the disk receptors illustrated in FIG. 1B. The rod receptor 12 has a basic structure that is substantially same. However, both of the receptors can be substituted by receptors of different types.

Figure 2B:
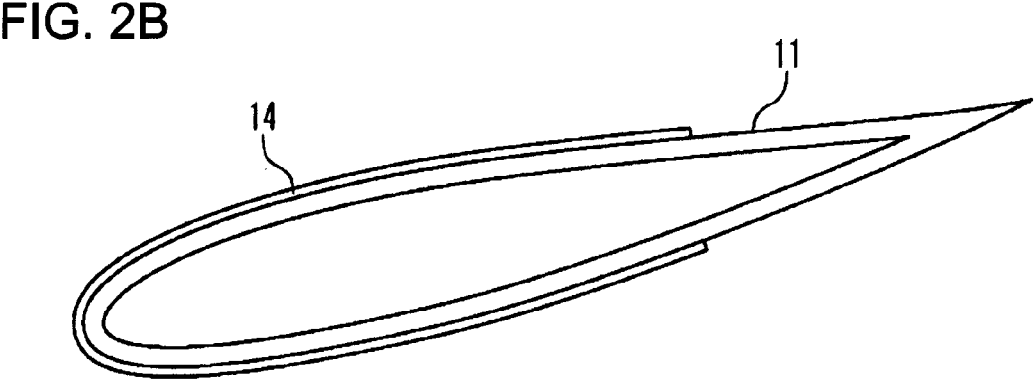
FIG. 2B A schematic view showing another structure of the wind turbine blade in relation to the first preferred embodiment of the present invention.

The external conductor layer 14 may be provided in each of the upwind side and the downwind side of the wind turbine blade 1 as shown in FIG. 2A or provided integrally in a continuous manner from the upwind side through the downwind side of the blade body 11 as shown in FIG. 2B. With the structure of FIG. 2B, the exterior conductor layer 14 can be arranged on the leading edge part where it is difficult to arrange a receptor, and thus, the higher rate of capturing lightning strikes can be firmly achieved.

According to the preferred embodiment, the surface of the outer shell of the blade body 11 is coated with or applied with the external conductor layer 14. This substantially achieves a larger area of receptors. The area of capturing lightning strikes can be increased by the above method which can be created simply. As a result, it is possible to improve the rate of capturing lightning strikes. Particularly, the external conductor layer 14 can be arranged on places other than the tip (places with a certain distance or more away from the blade tip toward the blade root). Thus, the capturing of lightning strikes by the disk receptors other than the blade tip part can be improved.

Second Preferred Embodiment

A wind turbine blade in relation to a second preferred embodiment of the present invention is described in reference to the attached drawings. In the second preferred embodiment, the disk receptor has a convex portion (protruding object) as a lightning protection. It is explained in detail below. The structure of the wind turbine blade other than the disk receptor may be, but not limited to the one illustrated in FIG. 1A or the one explained in other preferred embodiments and is not explained further.

Figure 3A:
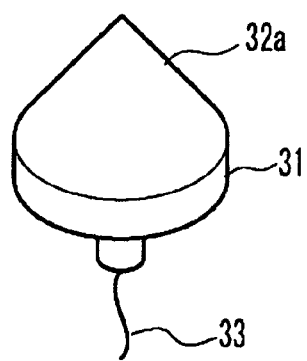
FIG. 3A A schematic view showing a structure of a disk receptor in relation to a second preferred embodiment of the present invention.

FIG. 3A is a schematic view showing a structure of a disk receptor in relation to the second preferred embodiment of the present invention. The disk receptor 13 has a receptor body 31, a convex portion 32a and a wire 33. The receptor body 31 is a conductive member having a shape of a disk. The top surface is formed along the surface of the blade body 11. The convex portion 32a is a conductive member, e.g. metal, having a conical shape disposed on the disk-shaped top surface. The bottom surface of the conical convex portion 32a overlaps the disk-shaped top surface and they are the same size. The wire 33 connects to the downconductor.

The disk receptor 13 has a conductive member whose tip protrudes like the convex portion 32a. By providing the conductive protruding member with a sharp end, a concentration ratio of lightning strikes around the receptor can be enhanced. As a result, it is possible to promote the progression of leader-streamer extending toward thunder clouds from the receptor. Specifically, it is possible to improve the rate of capturing lightning strikes by the disk receptor 13.

Figure 3B:
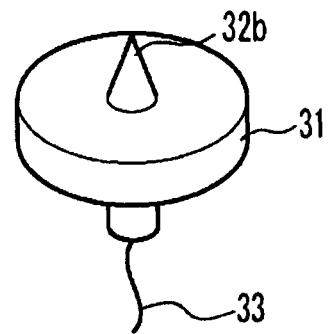
FIG. 3B A schematic view showing another structure of the wind turbine blade in relation to the second preferred embodiment of the present invention.

FIG. 3B is a schematic view showing another structure of the wind turbine blade in relation to the second preferred embodiment of the present invention. The disk receptor 13 has a receptor body 31, a convex portion 32b and a wire 33. The convex portion 32b is a conductive member, e.g. metal, having a conical shape disposed on the disk-shaped top surface of the receptor body 31. The bottom surface of the conical convex portion 32b is smaller than the disk-shaped top surface and the conical convex portion 32b is disposed in the center of the disk-shaped top surface. The receptor body 31 and the wire 33 are the same as those of FIG. 3A.

The disk receptor 13 has a conductive protruding member such as the convex portion 32b mounted on the top surface of the receptor body. By providing the conductive protruding member with a sharp end, a concentration ratio of lightning strikes around the receptor can be enhanced. As a result, it is possible to promote the progression of leader-streamer extending toward thunder clouds from the receptor. Specifically, it is possible to improve the rate of capturing lightning strikes by the disk receptor 13.

Figure 3C:
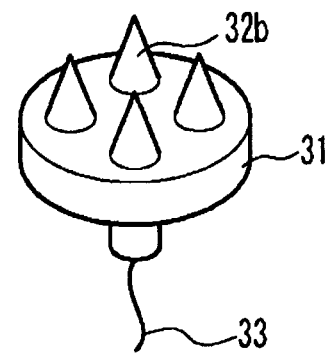
FIG. 3C A schematic view showing further another structure of the wind turbine blade in relation to the second preferred embodiment of the present invention.

FIG. 3C is a schematic view showing further another structure of the wind turbine blade in relation to the second preferred embodiment of the present invention. The disk receptor 13 has a receptor body 31, convex portions 32b and a wire 33. The disk receptor of FIG. 3c has a plurality of convex portions 32b of FIG. 3B mounted on the disk-shaped top surface of the receptor body 31. FIG. 3C shows four convex portions disposed on the top surface of the receptor body 31 but the number of the convex portions should not be limited.

The disk receptor 13 has a plurality of conductive protruding members such as the convex portions 32b mounted on the top surface of the receptor body. By providing the conductive protruding member with sharp ends, a concentration ratio of lightning strikes around the receptor can be enhanced. As a result, it is possible to promote the progression of leader-streamer extending toward thunder clouds from the receptor. Specifically, it is possible to improve the rate of capturing lightning strikes by the disk receptor 13.

Figure 3D:
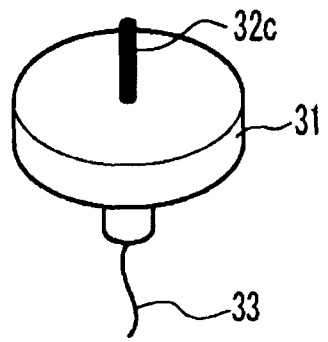
FIG. 3D A schematic view showing further another structure of the wind turbine blade in relation to the second preferred embodiment of the present invention.

FIG. 3D is a schematic view showing further another structure of the wind turbine blade in relation to the second preferred embodiment of the present invention. The disk receptor 13 has a receptor body 31, a convex portion 32c and a wire 33. The convex portion 32c is a conductive member, e.g. metal, having an acicular shape disposed on the disk-shaped top surface of the receptor body 31. The bottom surface of the acicular convex portion 32c is disposed in the center of the disk-shaped top surface. The receptor body 31 and the wire 33 are the same as those of FIG. 3A.

The disk receptor 13 has a conductive protruding members such as the convex portion 32c mounted on the top surface of the receptor body. By providing the conductive protruding member with a sharp end, a concentration ratio of lightning strikes around the receptor can be enhanced. As a result, it is possible to promote the progression of leader-streamer extending toward thunder clouds from the receptor. Specifically, it is possible to improve the rate of capturing lightning strikes by the disk receptor 13.

Alternatively, a plurality of convex portions 32c may be provided on the top surface of the receptor body 31 in the manner similar to FIG. 3C. This can achieve the same effects as the case of FIG. 3D. In the preferred embodiment, the present invention is applied to the disk receptor 13 but it is also applicable to the rod receptor 12 in the same manner.

As long as it does not affect the operation of the wind turbine (e.g. rotation efficiency and noise), the shape, combination and number of the convex portion (conductive protruding member) is not limited. For instance, as another example shape of the convex portion, there are thin column shape, a polygonal column shape and a polygonal cone. In the case of arranging more than one convex portion on the top surface, the convex portions may have the same shape or a combination of similar shapes or different shapes. This case also achieves the same effects as the cases of FIG. 3A through FIG. 3D.

Third Preferred Embodiment

A wind turbine blade in relation to a third preferred embodiment of the present invention is described in reference to the attached drawings. In the preferred embodiment, an insulator is provided around the downconductors as a measure for lightning protection. The details are described below.

Figure 4A:
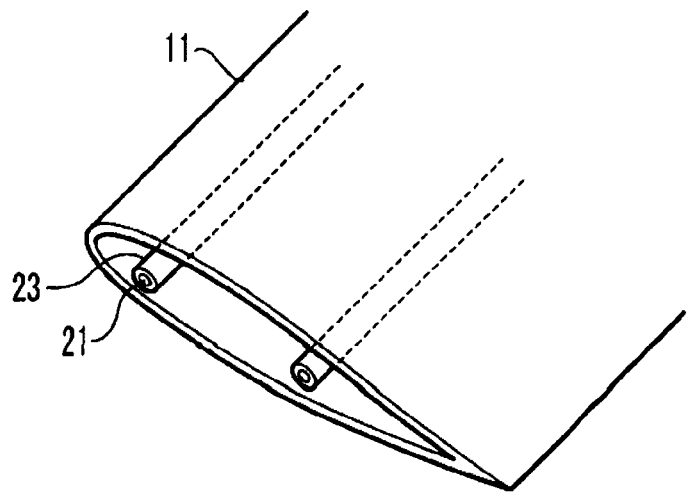
FIG. 4A A schematic view showing a structure of a wind turbine blade in relation to a third preferred embodiment of the present invention.

FIG. 4A is a schematic view showing a structure of a wind turbine blade in relation to a third preferred embodiment of the present invention. The wind turbine blade has a blade body 11, a rod receptor (unshown), a plurality of disk receptors (unshown), downconductors 21 and an insulating covering member 23. The downconductors 21 are connected to the disk receptors and the rod receptor and arranged across the inside of the blade body 11. The insulating covering member 23 is an insulator covering the surface of the downconductor 21. The rod receptor and the disk receptors are the same as those of the first preferred embodiment. In such a case that the wind turbine blade 1 is installed in a wind turbine generator, when the receptors (12, 13) is struck by lightning, lightening current is conducted to the ground through the downconductor, the inside of the blade, the rotor hub, the nacelle and the tower from the receptors.

The insulating covering member 23 is an insulating member which covers the downconductor. There is a chance that lightning penetrates through the outer shell of the blade body and strikes the downconductor 21 being conductive. By covering the downconductor 21 with the insulating covering member 23, a probability of lightning striking the downconductor 21 can be reduced. The insulating covering member 23 can be any type as long as it has a high insulation properties, and preferably lightweight material so that the operation of the wind turbine blade 1 is not much affected without causing substantial weight gain or decline of the rotation efficiency in such a case that the downconductor 21 is thickly covered by the insulating member.

The insulating covering member 23 covers at least a certain range of the downconductor 21 from the blade tip. That is because there is a high probability of lightning strike in the range. Or the insulating covering member 23 may cover the range of the whole conductor 21 to place more emphasis on the safety.

Figure 4B:
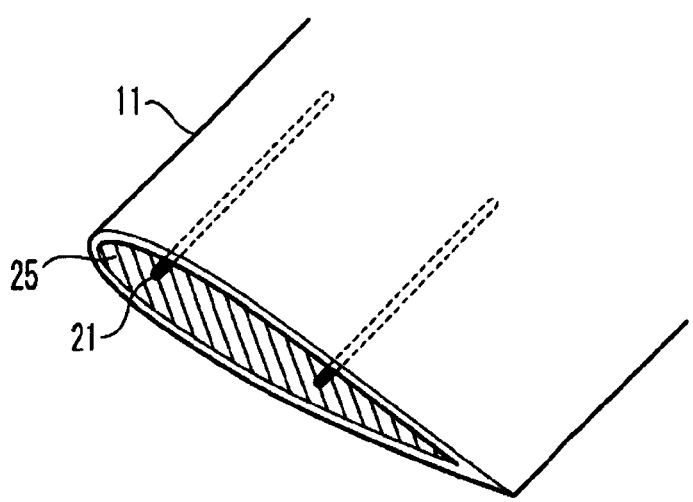
FIG. 4B A schematic view showing another structure of the wind turbine blade in relation to the third preferred embodiment of the present invention.

Alternatively, the inside of the blade body 11 may be filled with an insulating member 25 to surround the downconductor 21 as illustrated in FIG. 4. The filling of the insulating material 25 can be conducted alone instead of the insulating covering member 23 as shown in FIG. 4B or together with the insulating covering member 23. According to the example of FIG. 4B, the insulating member 25 fills the inside of the blade body 11 to surround the downconductor 21 without using the insulating covering member 23. This has a lighting strike prevention effect of the conductive members around it in addition to the effects obtained by the case of FIG. 4A.

By providing the insulating covering member 23 and/or the insulator 25 around the downconductor 21 (the downconductor 21 being embedded in the insulating covering member 23 and/or the insulator 25) according to the preferred embodiment, the probability of lightning striking the downconductor 21 can be reduced. By this, lightning is likely to strike the receptor near the downconductor instead of the downconductor itself. Specifically, it is possible to improve the rate of capturing lightning strikes by the disk receptor 13.

Fourth Preferred Embodiment

A wind turbine blade in relation to a fourth preferred embodiment of the present invention is described in reference to the attached drawings. In the preferred embodiment, a branching section of the downconductor is formed smooth as a measure for lightning protection. The details are described below.

Figure 5:
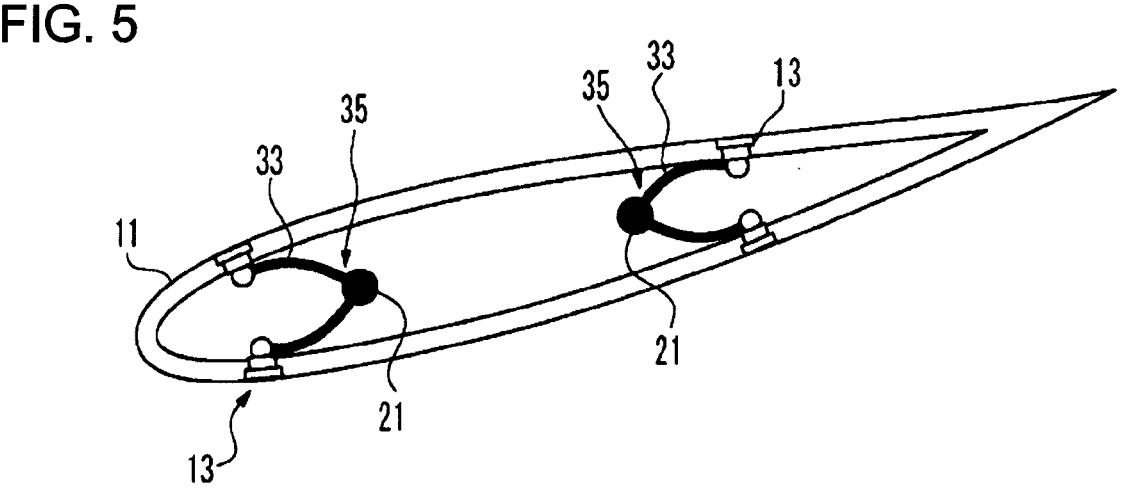
FIG. 5 A schematic view showing a structure of a wind turbine blade in relation to a fourth preferred embodiment of the present invention.

FIG. 5 is a schematic view showing a structure of a wind turbine blade in relation to a fourth preferred embodiment of the present invention. The wind turbine blade has a blade body 11, a rod receptor (unshown), a plurality of disk receptors (unshown), and downconductors 21. The downconductors 21 (for the receptors on the leading edge side and for the receptors on the trailing edge side) are connected to the disk receptors 13 and the rod receptor and arranged across the inside of the blade body 11. The downconductors are connected to each of the disk receptors 13 and the rod receptor via the wires 33. The rod receptor and the disk receptors are the same as those of the first preferred embodiment.

The connection part 35 (the branching section) where the wires 33 and the conductor 21 are connected is formed into a shape with fewer convex spots on the surface. The convex spots of the connection part 35 has higher concentration of electric field. Lightning may strike at the convex spots and penetrates the outer shell of the blade body 11. Therefore, by making the surface of the connection part 35 smooth so as to lessen the concentration of electrical field, the probability of lightning striking the connection part 35 becomes smaller.

In such a case that both the wire 33 and the downconductor 21 are metal conductive wires, the connection part 35 is preferably formed by a method such as welding, soldering and explosive bonding instead of joining the conductive wires by screws. The permissible size of convex spots of the connection part 35 depends on the size of the wind turbine or the installation site but preferably, for instance, about ±2 mm or less.

By forming the connection part 35 (the branching portion) into a shape with fewer convex spots on the surface and small concentration of electric field, it is possible to reduce the probability of lightning striking the connection part 35. As a result, lightning is likely to strike the receptors arranged near the connection part 35 instead of the connection part 35 itself. Specifically, it is possible to improve the rate of capturing lightning strikes by the receptors.

Fifth Preferred Embodiment

A wind turbine blade in relation to a fifth preferred embodiment of the present invention is described in reference to the attached drawings. In the preferred embodiment, one downconductor is provided for the receptors on the leading edge side and the receptors on the trailing edge side together as a measure for lightning protection. The details are described below.

Figure 6A:
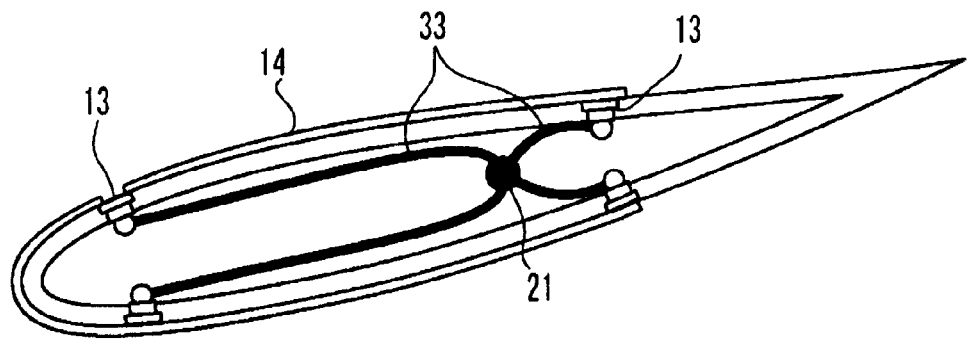
FIG. 6A A schematic view showing a structure of a wind turbine blade in relation to a fifth preferred embodiment of the present invention.
Figure 6B:
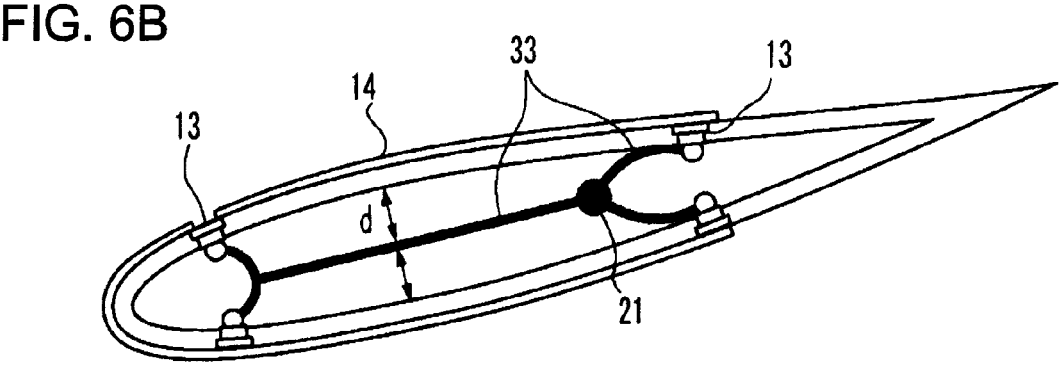
FIG. 6B A schematic view showing another structure of the wind turbine blade in relation to the fifth preferred embodiment of the present invention.

FIG. 6A is a schematic sectional view showing a structure of a wind turbine blade in relation to a fifth preferred embodiment of the present invention. The wind turbine blade 1 has the blade body 11, the rod receptor (unshown), a plurality of disk receptors 13, and a downconductor 21. The downconductor 21 is shared between the receptors on the leading edge side and the receptors on the trailing edge side. The downconductor 21 is connected to the disk receptors 13 and the rod receptor and arranged across the inside of the blade body 11. The disk receptors 13 and the rod receptor are respectively connected to the common downconductor 21 via the wires 33. Girders (unshown) are provided between the leading edge and the trailing edge so as to join the wires 33. The rod receptor and the disk receptors 13 are the same as those of the first preferred embodiment.

In the preferred embodiment, the common downconductor 21 is provided for the receptors on the leading edge side and for the receptors on the trailing edge side. As already described in the third preferred embodiment, there is a chance that lightning penetrates the outer shell of the blade body 11 and strikes at the conductive downconductor 21. Therefore, the common downconductor 21 is provided instead of a pair of downconductors so as to reduce the chance of lightning striking the downconductor 21.

In the case illustrated in FIG. 6A, the common downconductor 21 is arranged on the trailing edge side. The common downconductor 21 is shared by both of the receptors on the leading edge side and the receptors on the trailing edge side. It is preferable to arrange the downconductor 21 on the trailing edge side in the case of controlling all the blades in a feathering position and direction the wind turbine towards lightning cloud in response to approaching of lightning. This puts the downconductors 21 relatively farther from the lightning cloud and the receptors relative closer to the lightning cloud. However, the present invention should not be limited to this exemplary structure. It is also possible to arrange the common downconductor on the leading edge side of the blade body 11.

The structure of the wires 33 is not limited to the exemplary structure of FIG. 6A. For instance, the wires on the leading edge side may be bound together on the leading edge side and the bound wire 33 is lead through approximately halfway between the upwind side and the downwind side of the blade body 11 (a position with a distance "d" from the upwind side and the downwind side). The bound wire 33 is connected to the downconductor on the leading edge side. There is a chance that lightning penetrates through the outer shell of the blade body 11 and strikes at the conductive wires 33. Thus, by arranging the wires 33 away from the outer shell of the blade body 11, it is possible to reduce the probability of lightning striking the wires 33.

According to the preferred embodiment, the common downconductor is provided for both the receptors on the leading edge side and the receptors on the trailing edge side. It is possible to reduce the number of downconductors 21 that may be struck by lightning, thereby reducing the probability of lightning striking the downconductor 21. As a result, lightning tends to strike the receptors near the downconductor 21 instead of the downconductor 21 itself. This improves the rate of capturing lightning strikes by the receptors.

Sixth Preferred Embodiment

A wind turbine blade in relation to a sixth preferred embodiment of the present invention is described in reference to the attached drawings. In the preferred embodiment, a drying unit for drying the inside of the blade body is provided as a measure for lightning protection. The details are described below.

Figure 7A:
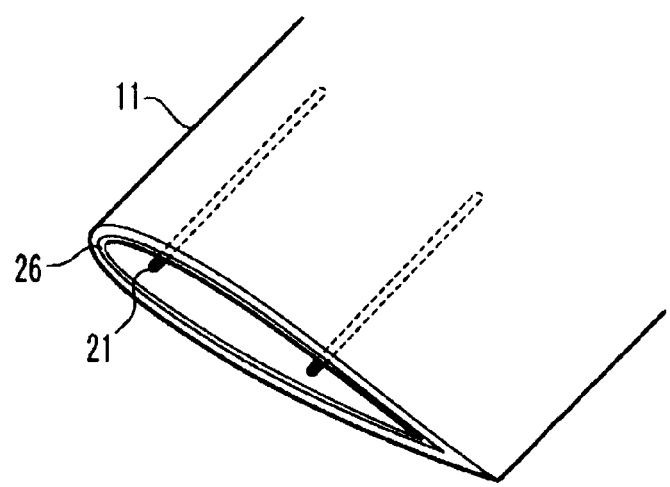
FIG. 7A A schematic view showing a structure of a wind turbine blade in relation to a sixth preferred embodiment of the present invention.

FIG. 7A is a schematic sectional view showing a structure of a wind turbine blade in relation to a sixth preferred embodiment of the present invention. The wind turbine blade 1 has the blade body 11, the rod receptor (unshown), a plurality of disk receptors (unshown), downconductors 21 and a drying unit 26. The drying unit 26 is a layer of desiccant agent applied to the inside of the blade body 11. The rod receptor, the disk receptors and the downconductors 21 are the same as those of the first preferred embodiment.

In the preferred embodiment, the desiccant agent or a dehumidifying agent is applied to the inside of the blade body 11 as the drying unit 26. The desiccant agent and the dehumidifying agent may be any type as long as it absorbs moisture. The known material such as silica gel or calcium chloride may be used as the drying unit. By providing the drying unit 26, moisture of the blade body 11 can be reduced. As a result, it is possible to prevent pressure rise such as vapor explosion caused by sudden temperature rise of moisture inside of the blade body 11 in the event of lightning strike. By this, the damages of the wind turbine blade 1 caused by the pressure rise and vapor explosion can be prevented.

In the exemplary case of FIG. 7A, the desiccant agent, the dehumidifying agent or the like is applied all over the inside of the blade body 11. However, the present invention should not be limited to this exemplary case as long as the drying agent is applied to the inside of at least the places with higher probability of lightning striking. Alternatively, instead of applying the drying agent to the inside of the blade body 11, the desiccant agent, the dehumidifying agent or the like can be contained in a container, a bag or the like that has air permeability and placed in places inside of the blade body 11 as many as needed.

Figure 7B:
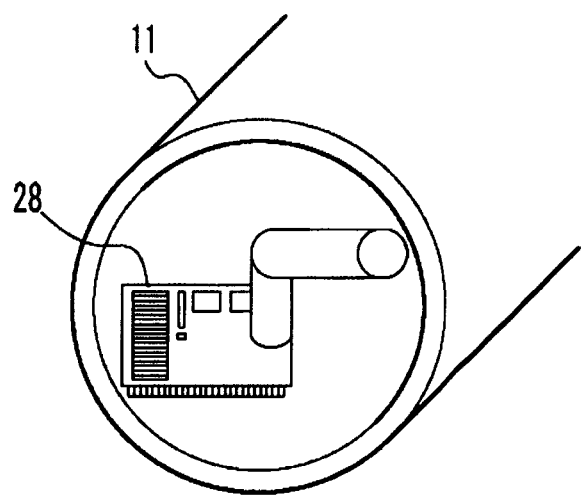
FIG. 7B A schematic view showing another structure of the wind turbine blade in relation to the sixth preferred embodiment of the present invention.

The structure of the drying unit 26 should not be limited to the exemplary case of FIG. 7A. For instance, a dehumidifier 28 can be provided as the drying unit 2 in the root part of the blade body 11 (e.g. approximately 2 m in diameter) as shown in FIG. 7B. The power is supplied from the rotor head (unshown). In this case as well, moisture of the blade body 11 can be reduced. As a result, it is possible to prevent pressure rise such as vapor explosion caused by sudden temperature rise of moisture inside of the blade body 11 in the event of lightning strike. By this, the damages of the wind turbine blade 1 caused by the pressure rise and vapor explosion can be prevented. The accumulated water can be discharged from adequate places or used as cooling water for cooling other devices.

According to the preferred embodiment, the drying unit 26 is provided inside the blade body 11. As a result, it is possible to prevent pressure rise such as vapor explosion caused by sudden temperature rise of moisture inside of the blade body 11 in the event of lightning strike. By this, the damages of the wind turbine blade 1 caused by the pressure rise and vapor explosion can be prevented.

Seventh Preferred Embodiment

A wind turbine blade in relation to a seventh preferred embodiment of the present invention is described in reference to the attached drawings. In the preferred embodiment, a photocatalyst is provided on the outer side of the blade body as a measure for lightning protection. The details are described below.

Figure 8:
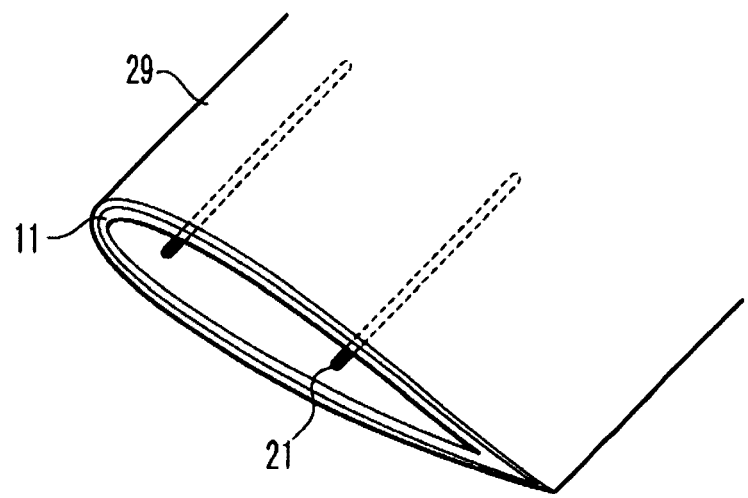
FIG. 8 A schematic view showing a structure of a wind turbine blade in relation to a seventh preferred embodiment of the present invention.

FIG. 8 is a schematic sectional view showing a structure of a wind turbine blade in relation to the seventh preferred embodiment of the present invention. The wind turbine blade 1 has the blade body 11, the rod receptor (unshown), a plurality of disk receptors (unshown), downconductors 21 and a photocatalytic member 29. The photocatalytic member 29 is a layer of photocatalyst applied to the outside of the blade body 11. The rod receptor, the disk receptors and the downconductors 21 are the same as those of the first preferred embodiment.

In the preferred embodiment, a photocatalyst is applied to the outside of the blade body 11 as the photocatalytic member 29. As the photocatalyst, known materials such as titanium oxide can be used. The photocatalyst can clean up contamination on the surface of the blade body 11 by anti-contamination effect and super hydrophilic effect, thereby preventing water droplets attached to the surface. By this, it is possible to prevent contamination on the surface of the blade body 11 by the adhered objects and creeping discharge caused by lightning running across the blade surface. As a result, the rate of capturing lightning strikes can be improved.

In the exemplary case of FIG. 8, the photocatalytic member 29 is applied to the entire surface of the outside of the blade body 11. However, the present invention should not be limited to this exemplary case as long as the photocatalytic member 29 is applied to the outside of at least the places with higher probability of lightning striking. The photocatalyst may be one kind or a combination of different kinds of photocatalysts.

According to the preferred embodiment, the photocatalytic member 29 is provided on the outside of the blade body 11. Therefore, it is possible to prevent contamination on the surface of the blade body 11 by the adhered objects and creeping discharge caused by lightning running across the blade surface. As a result, the rate of capturing lightning strikes can be improved.

The wind turbine blade described in the first through seventh preferred embodiments can be applied to a wind turbine generator. By this, a wind turbine generator which improves the rate of capturing lightning strikes by the receptors and also prevents damages of the blade body caused by lightning strikes.

Eight Preferred Embodiment

A wind turbine generator having a wind turbine blade in relation to a eighth preferred embodiment of the present invention is described in reference to the attached drawings. In the preferred embodiment, each of the wind turbine blades is processed for a different measure for lightning protection. The details are described below.

Figure 9A:
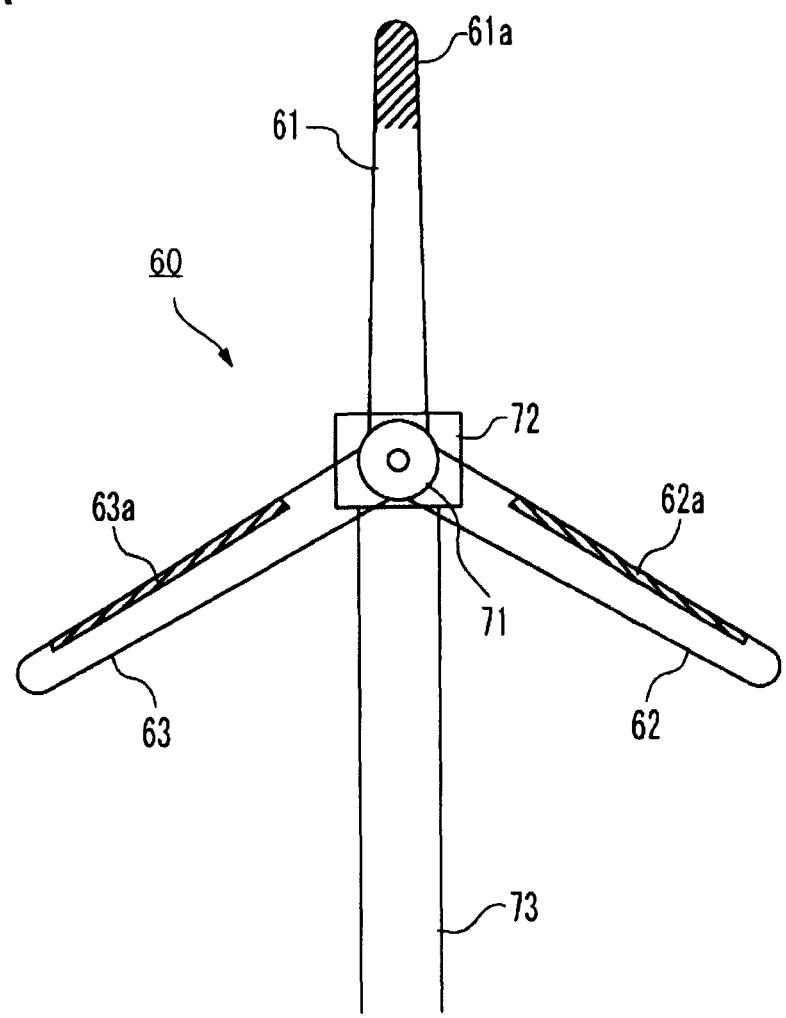
FIG. 9A A schematic view showing a structure of a wind turbine generator in relation to a eighth preferred embodiment of the present invention.

FIG. 9(A) is a schematic view showing a structure of a wind turbine generator in relation to the eighth preferred embodiment of the present invention. The wind turbine generator 60 has a first wind turbine blade 61, a second wind turbine blade 62, a third wind turbine blade 63, a rotor head 71, a nacelle 72 and a tower 73. The nacelle 72 is installed on the top of the tower 73 rotatably around a vertical direction. The rotor head 71 is connected to the nacelle 72 rotatably around an axis with a certain tilt angle from the horizontal direction. The first wind turbine blade 61, the second wind turbine blade 62 and the third wind turbine blade 63 are provided on the rotor head 71 so as to be capable of feathering.

Each of the first wind turbine blade 61, the second wind turbine blade 62 and the third wind turbine blade 63 has at least a rod receptor, a plurality of disk receptors and a downconductor in the blade body as a measure for lightning protection. The rod receptor is embedded in the tip of the blade body and exposed on the surface of the blade body. The disk receptors are embedded on the tip side of the blade body and exposed on the surface of the blade body. The downconductor is connected to the disk receptors and the rod receptor and installed across the inside of the blade body. In such a case that this wind turbine blade is installed in the wind turbine generator, in the event of lightning striking the receptors, the lightning current is conducted to the ground from the receptors through the downconductors, the inside of the blade, the rotor hub, the nacelle and the tower.

As the measure for lightning protection of the first wind turbine blade 61, the second wind turbine blade 62 and the third wind turbine blade 63, basically each device (the blade body 111, the rod receptor 112, the disk receptors 113 and the downconductor 121) as described in FIG. 1A and FIG. 1B can be used. In the preferred embodiment, as another measure for lightning protection, described are a method of changing the number and the size of the receptors in a certain part of each wind turbine blade and a method of using the wind turbine blade of the first through seventh preferred embodiments (or, the measures used in the preferred embodiments). This creates function effects that are not seen in the cases of FIG. 1A and FIG. 1B, and realizes the measure for lightning protection that is low-cost and effective. The details are described below.

The first wind turbine blade 61 has a tip part 61a which is processed more (additionally) for lightning protection. As a measure for lightning protection, the number of the receptors (disk receptors, rod receptors or the like) is increased or the receptors are respectively enlarged in the tip part 61a of the blade. It is possible to adopt the measures described in the first to seventh preferred embodiments in the tip part 61a of the blade. In the case of using the measures described in the first to seventh preferred embodiments, one or more measures or a combination of different measures may be used. By this, the rate of capturing lightning strikes at the tip part 61a becomes higher than other parts of the blade. Therefore, other parts of the blade can be processed relatively less for lightning protection.

The second wind turbine blade 62 has an upwind part 62a which is processed more (additionally) for lightning protection. The second wind turbine blade 62 is the one next to the first wind turbine blade in the clockwise direction from the front of the rotor head 71. As the measure for lightning protection, the number of the receptors (disk receptors, rod receptors or the like) is increased or the receptors are respectively enlarged in the upwind part 62a of the blade. It is possible to adopt the measures described in the first to seventh preferred embodiments in the tip part 61a of the blade. The details are described later. In the case of using the measures described in the first to seventh preferred embodiments, one or more measures or a combination of different measures may be used. The adopted measure for the second wind turbine blade 62 may be the same as or different from that for the first wind turbine blade 61. By this, the rate of capturing lightning strikes at the tip part 61a becomes higher than other parts of the blade. Therefore, other parts of the blade can be processed relatively less for lightning protection.

The third wind turbine blade 63 has a downwind part 63a which is processed more (additionally) for lightning protection. The third wind turbine blade 63 is the one next to the second wind turbine blade 62 in the clockwise direction from the front of the rotor head 71. As the measure for lightning protection, the number of the receptors (disk receptors, rod receptors or the like) is increased or the receptors are respectively enlarged in the downwind part 63a of the blade. It is possible to adopt the measures described in the first to seventh preferred embodiments in the downwind part 63a of the blade. The details are described later. In the case of using the measures described in the first to seventh preferred embodiments, one or more measures or a combination of different measures may be used. The adopted measure for the third wind turbine blade 63 may be the same as or different from those for the first wind turbine blade 61 and the second wind turbine blade 62. By this, the rate of capturing lightning strikes at the tip part 61a becomes higher than other parts of the blade. Therefore, other parts of the blade can be processed relatively less for lightning protection.

The other parts of each of the first wind turbine blade 61, the second wind turbine blade 62 and the third wind turbine blade 63 is, for instance, processed with regular measure for lightning protection (e.g. FIG. 1A).

The receptors may be, but not limited to, the disk receptors and the rod receptors that are described above. Receptors of different types may be used as the disk receptors and the rod receptor.

Figure 9B:
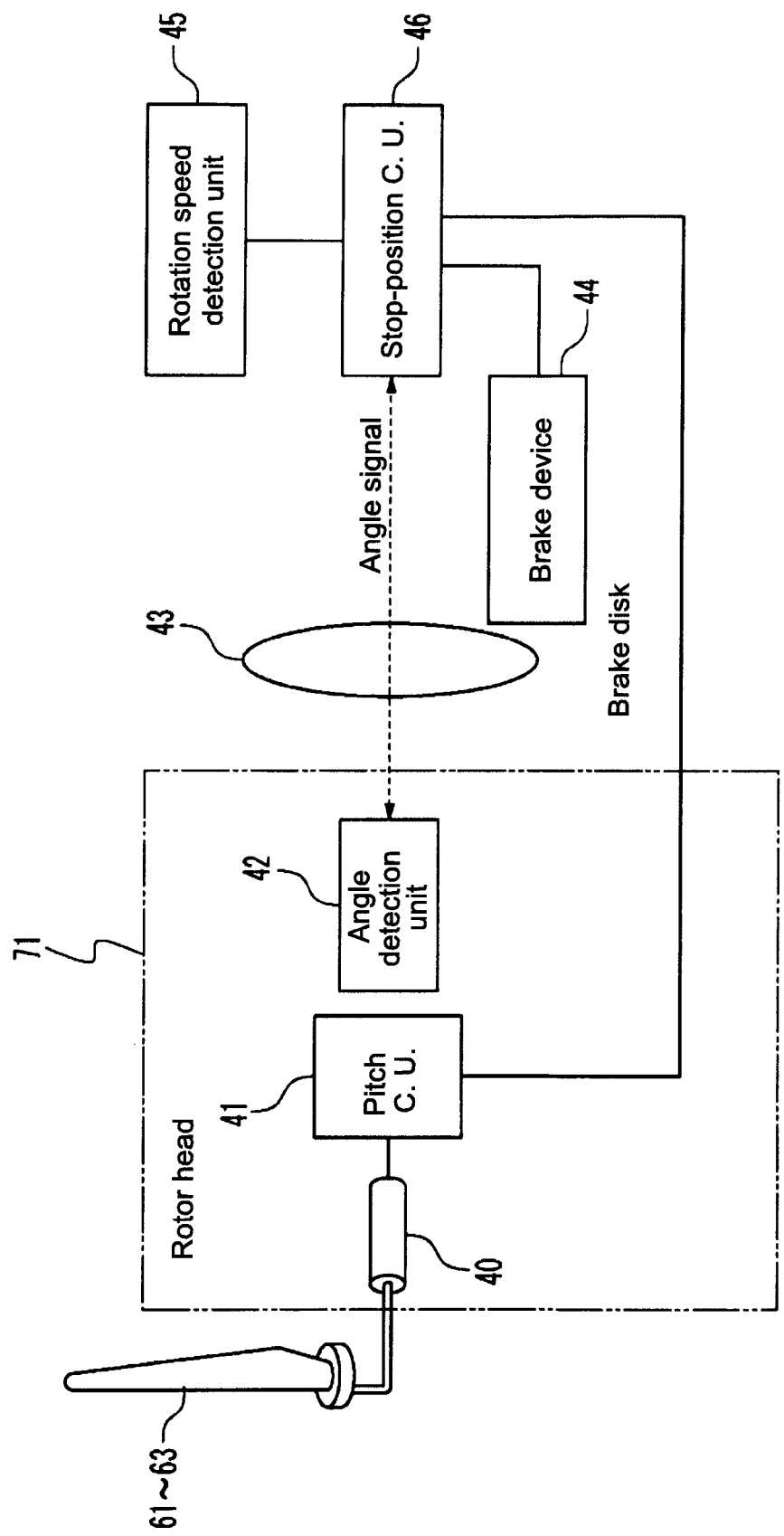
FIG. 9B A block diagram showing a structure regarding position control of the wind turbine blade of the wind turbine generator in relation to the eighth preferred embodiment of the present invention.

FIG. 9B is a block diagram showing a structure regarding position control of the wind turbine blade of the wind turbine generator in relation to the first preferred embodiment of the present invention. The rotor head 71 has the first to third wind turbine blades 61, 62, 63 mounted thereon as described above, as well as a hydraulic cylinder 40, a pitch control unit 41 and an angle detection unit 42. The hydraulic cylinder 40 drives the first to third wind turbine blades 61, 62, 63 mounted on the rotor head 71. The pitch control unit 41 controls the hydraulic pressure supplied to the hydraulic cylinder 40 so as to control the pitch angle of the first to third wind turbine blades 61, 62, 63 accordingly in response to conditions such as the wind speed. The angle detection unit 42 detects azimuth angles of the first to third wind turbine blades 61, 62, 63 as angle signals and outputs the detected angle signal to a stop-position control unit 46.

The nacelle 72 houses a gearbox (unshown), a generator (unshown), a brake disk 43, a brake device 44, a rotation speed detection unit 45 and the stop-position control unit 46. The generator is connected to the rotor head 71 via the gearbox disposed on a main shaft (unshown) coaxially with the rotor head 71. Specifically, the rotation of the rotor head 71 is increased by the gearbox to drive the generator. By this, generator output (electrical power) is produced by the generator. The brake disk 43 is connected to the rotor head 71 via the main shaft. The brake disk 43 is a rotator to reduce the speed of or stop the rotor head and the first to third wind turbine blades 61, 62, 63. The brake device 44 controls the driving of the brake disk 43 so as to reduce the speed of or stop the rotor head 71 and the first to third wind turbine blades 61, 62, 63 as well as releasing the speed reduction or the brake. The rotation speed detection unit 45 detects the rotation speed per unit time of the first to third wind turbine blades 61, 62, 63 by wind force and sends the detection results to the stop-position control unit 46.

The stop-position control unit 46 performs such control as to stop the first to third wind turbine blades 61, 62, 63 at a desired position (angle). Specifically, the rotation of the first to third wind turbine blades 61, 62, 63 is stopped in the following process. First, the stop-position control unit 46 sends the pitch control unit 41 the control signal to change the pitch of the first to third wind turbine blades 61, 62, 63 from a fine position (generator side) to a feathering position (stop side). By this, the rotation speed of the first to third wind turbine blades 61, 62, 63 is reduced. Then, the stop-position control unit 46 calculates the rotation speed of the first to third wind turbine blades 61, 62, 63 based on the rotation speed sent from the rotation speed detection unit 45. When the rotation speed thereof becomes close to a prescribed speed, the stop-position control unit 46 sends the pitch control unit 41 the signal to change the pitch of the first to third wind turbine blades 61, 62, 63 slightly to the side of the fine position so as not to stop the rotation of the blades. However, the prescribed speed is, for instance, 1 to 5% of the rated rotation speed. Then, based on the detection results sent from the angle detection unit 42, the stop-position control unit 46 sends a brake signal to the brake device 14 once the first to third wind turbine blades 61, 62, 63 is at the desired position (angle). By this, the first to third wind turbine blades 61, 62, 63 can be stopped. However, the final stop-position in the preferred embodiment is where the tip part 61a of the first wind turbine blade 61 is positioned upright (the tip part 61a being positioned at the highest) as shown in FIG. 9A.

The structure regarding the position control of the wind turbine blade

The rotation of the first to third wind turbine blades 61, 62, 63 is temporally stopped in a normal manner, and then the wind turbine rotates at slow speed by a small motor (unshown) provided separately to stop the blades at the desired position. Specifically, after stopping the wind turbine, the stop-position control unit 46 control the small motor to move a gear (unshown) which can rotate the main shaft so as to drive the wind turbine at low speed. Then, based on the detection results of the angle detection unit 42, the brake device 44 stops the rotation of the first to third wind turbine blades 61, 62, 63 once the blades 61, 62, 63 are at the desired position (angle).

With the structure described above, each of the wind turbine blades can be stopped in such a state that the blades are at the desired pitch angle as well as the desired azimuth angle. For instance, each of the wind turbine blades can be stopped in such a state that the first to third wind turbine blades 61, 62, 63 are all feathered and the tip part 61a of the first wind turbine blade 61 is positioned upright.

With the structure shown in FIG. 9B, the wind turbine blades are stopped at such position where the first wind turbine blade 61 is positioned upright as illustrated in FIG. 9A so that all of the wind turbine blades 61, 62, 63 are positioned such as to direct the processed part for lightning protection toward the direction of the approaching lightning. As a result, it is not necessary to process all the blades in the same way for lightning protection to handle lightning strikes effectively.

In the exemplary case of FIG. 9A, all of the first to third wind turbine blades are processed for lightning protection. However, the present invention is not limited to this. For instance, it is possible to process only the tip part 61a of the first wind turbine blade significantly for lightning protection while sparing the lightning protection for the second and third wind turbine blades. In this case, the tip part which is processed for lightning protection can be directed upward toward the direction of the approaching lightning. By this, lightning strikes can still effectively be handled without processing all of the blades in the same manner.

Figure 10:
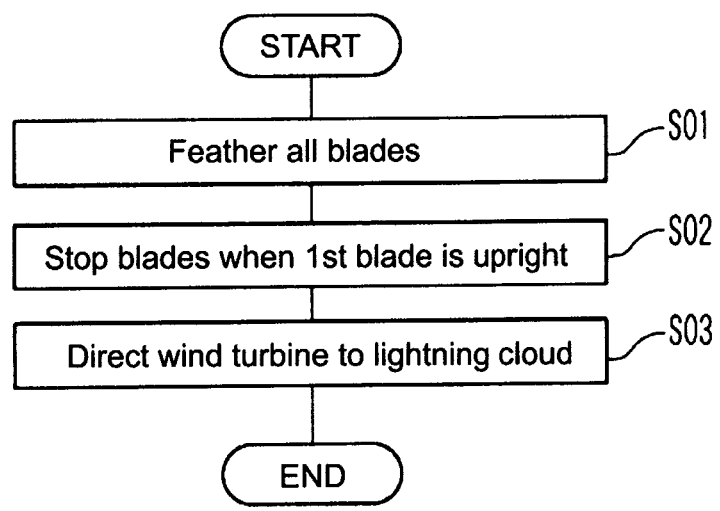
FIG. 10 A flow chart showing an operation of the wind turbine generator in relation to the eighth preferred embodiment of the present invention.

The operation of the wind turbine generator in relation to the preferred embodiment is described below. FIG. 10 is a flow chart showing the operation of the wind turbine generator in relation to the eighth preferred embodiment of the present invention. When approaching of lightning clouds is detected by a variety of lightning information source (a weather cast, a weather radar, a lightning strike sensor, a lightning position rating system or the like), users, a wind turbine generator or the control devices of the wind turbine generators automatically or manually controls the wind turbine generator 60 to perform the following operation.

First, the wind turbine generator 60 feathers all of the blades and reduces its rotation speed (step S1). Specifically, the rotation of the first to third wind turbine blades 61, 62, 63 is stopped in the following process. First, the stop-position control unit 46 sends the pitch control unit 41 the control signal to change the pitch of the first to third wind turbine blades 61, 62, 63 from a fine position (generator side) to a feathering position (stop side). The pitch control unit 41 control the hydraulic pressure supplied to the hydraulic cylinder 40 in response to the control signal so as to control the pitch angle of all of the first to third wind turbine blades 61, 62, 63 into the feathering position. By this, the rotation of the first to third wind turbine blades 61, 62, 63 decreases. The angle detection unit 42 continuously detects azimuth angles of the first to third wind turbine blades 61, 62, 63 as angle signals and outputs the detected angle signal to a stop-position control unit 46.

Secondly, the wind turbine generator 60 stops the rotation of the blades when the first wind turbine blade 61 comes upright (step S2). Specifically, the stop-position control unit 46 calculates the rotation speed of the first to third wind turbine blades 61, 62, 63 based on the rotation speed sent from the rotation speed detection unit 45. When the rotation speed thereof becomes close to the prescribed speed, the stop-position control unit 46 sends the pitch control unit 41 the control signal to change the pitch of the first to third wind turbine blades 61, 62, 63 slightly to the side of the fine position so as not to stop the rotation of the blades. In response to the control signal, the pitch control unit 41 controls the hydraulic pressure supplied to the hydraulic cylinder 40 so as to change the pitch angle of the first to third wind turbine blades 61, 62, 63 slightly toward the fine position side. Then, based on the detection result sent from the angle detection unit 42, the stop-position control unit 46 sends the brake device 14 a brake signal when the first to third wind turbine blades 61, 62, 63 comes into the desired positions. The desired position here is a prescribed position immediately before the tip part 61a of the first wind turbine blade comes upright with consideration of the time rag of braking. In response to the control signal, the brake device 44 controls driving of the brake disk 43 so as to stop the rotation of the first to third wind turbine blades 61, 62, 63. By this, the first to third wind turbine blades 61, 62, 63 are stopped at the position where the tip part 61a of the first wind turbine blade 61 comes upright (the highest point) as shown in FIG. 9A. The position is shown in FIG. 9A.

Thirdly, the wind turbine generator 60 is yawed to follow the direction of the lightning cloud instead of the wind direction while maintaining the position of the blades shown in FIG. 9A. The wind turbine generator 60 directly faces the direction of approaching lightning (step S3). The yawing of the wind turbine generator 60 toward the lightning cloud can be performed with the steps S1 and S2 before the steps S1 and S2 are completed.

By maintaining this state (of $S_3$), the part processed for lightning protection of each of the first to third wind turbine blades 61, 62, 63 (the tip part 61a, the upwind part 62a and the downwind part 63a) can be positioned toward the direction of approaching lightning. As a result, the rate of capturing lightning strikes by the receptors can be improved.

In the preferred embodiment, instead of processing all of the blades for the same lightning protection, each of the blades is processed differently for lightning protection depending on the position where the rotation of the blade is stopped in the event of approaching lightning cloud. Thus, by processing intensively and additionally the parts with higher probability of lightning strikes, other parts of the blades can be processed normally for lightning protection. Therefore, in comparison to the case of processing all of the blade the same lightning protection, the lightning protection can be lower cost and more effective. The method of stopping the rotation of the blades at the prescribed position may be performed by the combination of a brake unit such as a brake disk and a drive unit such as a motor.

By combining the measures for lightning of this preferred embodiment with measures for lightning protection described in the first to seventh preferred embodiments, it is possible to obtain the same effects as the first to seventh preferred embodiment and further to improve the effects.

According to each of the preferred embodiments of the present invention, it is possible to prevent the damages of the wind turbine blade caused by lightning strikes by a inexpensive and simple construction without requiring a significant design change or major construction, and to improve the rate of capturing lightning strikes in the wind turbine blade having the receptors.

The present invention is not limited to the above preferred embodiments and it is to be understood that various changes and modifications will be apparent to those skilled in the art within the scope of the present invention. Unless there is technical inconsistency, the configurations described in each of the preferred embodiments can be interchanged and combined with one another.

The invention claimed is:

1. A wind turbine blade, comprising:
   a blade body;
   a plurality of receptors which is embedded in the blade body and exposed on a surface of the blade body;
   a conductor layer which is provided on the surface of the blade body and connects the plurality of receptors to one another, the conductor layer being arranged on an upwind side surface and a downwind side surface the blade body in a continuous manner from the upwind side surface to the downwind side surface through a leading edge of the blade body; and
   a downconductor which is connected to the plurality of receptors and provided in the blade body.

2. The wind turbine blade according to claim 1, wherein the conductor layer is at least one selected from the group consisting of a conductive tape, a conductive mesh, a conductive foil, and a conductive diverter strip.

3. The wind turbine blade according to claim 1, wherein each of the plurality of receptors comprises a receptor body having a face formed along the surface of the blade body and a convex portion disposed on the face of the receptor body.

4. The wind turbine blade according to claim 3, wherein the convex portion of the receptor is at least one selected from the group consisting of an acicular conductor, a conical conductor, a cylindrical conductor, and a prismatic conductor.

5. The wind turbine blade according to claim 1, further comprising a photocatalyst which is applied to the surface of the blade body and cleanses the surface of the blade body.

6. A wind turbine generator equipped with the wind turbine blade of claim 1, comprising:
   a nacelle mounted rotatably on a support;
   a rotor head which is connected rotatably to the nacelle; and
   first, second and third wind turbine blades each of which is constituted of the wind turbine blade,
   wherein the first wind turbine blade has a tip part which is additionally processed for lightning protection, and
   wherein, in response to approaching of lightning, the first to third wind turbine blades are feathered and stopped in such a position that the first wind turbine blade is positioned upright.

7. The wind turbine generator according to claim 6,
   wherein the second wind turbine blade has an upwind part on an upwind-side which is additionally processed for lightning protection,
   wherein the third wind turbine blade has a downwind part on a downwind-side which is additionally processed for lightning protection, and
   wherein, in response to approaching of lightning, the second and third wind turbine blades are stopped in such a position that the upwind part of the second wind turbine blade faces upward and the downwind part of the third wind turbine blade faces upward.

8. The wind turbine generator according to claim 7, wherein each of the tip part of the first wind turbine blade, the upwind part of the second wind turbine blade and the downwind part of the third wind turbine blade has a bigger receptor or more receptors of the plurality of receptors than other area of said each blade.

9. The wind turbine generator according to claim 7, wherein the conductor layer is provided on a surface of the blade body in each of the tip part of the first wind turbine blade, the upwind part of the second wind turbine blade and the downwind part of the third wind turbine blade.

10. The wind turbine generator according to claim 7, wherein the downconductor is embedded in an insulator in each of the tip part of the first wind turbine blade, the upwind part of the second wind turbine blade and the downwind part of the third wind turbine blade.

11. The wind turbine generator according to claim 7, further comprising a connection part which comprises a wire connecting the receptors to the downconductor,
wherein the connection part is formed smooth in each of the tip part of the first wind turbine blade, the upwind part of the second wind turbine blade and the downwind part of the third wind turbine blade.

12. The wind turbine generator according to claim 7,
wherein the plurality of receptors includes a plurality of first receptors which is embedded in a leading-edge side of the blade body and exposed on the surface of the blade body and a plurality of second receptors which is embedded in a trailing-edge side of the blade body and exposed on the surface of the blade body, and
wherein the downconductor is shared between the plurality of first receptors and the plurality of second receptors in each of the tip part of the first wind turbine blade, the upwind part of the second wind turbine blade and the downwind part of the third wind turbine blade.

13. The wind turbine generator according to claim 7, wherein each of the plurality of receptors that is provided in each of the tip part of the first wind turbine blade, the upwind part of the second wind turbine blade and the downwind part of the third wind turbine blade has a receptor body having a face formed along the surface of the blade body and a convex portion disposed on the face of the receptor body.

14. The wind turbine generator according to claim 7, further comprising a drying unit which dries an inside of the blade body and is provided in each of the tip part of the first wind turbine blade, the upwind part of the second wind turbine blade and the downwind part of the third wind turbine blade.

15. The wind turbine generator according to claim 7, further comprising a photocatalyst which is applied to the surface of the blade body in each of the tip part of the first wind turbine blade, the upwind part of the second wind turbine blade and the downwind part of the third wind turbine blade, and cleanses the surface of the blade body.

16. A wind turbine generator, comprising:
the wind turbine blade according to claim 1.

17. An operation method of a wind turbine generator which comprises
a nacelle mounted rotatably on a support,
a rotor head which is connected rotatably to the nacelle,
first, second and third wind turbine blades each of which is provided on the rotor head and capable of feathering, the first wind turbine blade having a tip part which is additionally processed for lightning protection, the second wind turbine blade having an upwind part which is additionally processed for lightning protection, and the third wind turbine blade having a downwind part which is additionally processed for lightning protection, the method comprising the steps of:
feathering the first to third wind turbine blades in response to approaching of lightning; and
stopping rotation of the rotor head in such a stop position that the first wind turbine blade having the tip part that is additionally processed for lightning protection compared to other parts of the first wind turbine blade is oriented along a vertical direction with the tip part facing upward,
wherein in the stopping step, the second wind turbine blade having the u win that is additionally processed for lightning protection compared to other parts of the second wind turbine blade is oriented so that the upwind part faces upward, and the third wind turbine blade having the downwind part that is additionally processed for lightning protection compared to other parts of the third wind turbine blade is oriented so that the downwind part faces upward.

18. The operation method of the wind turbine generator according to claim 17, further comprising the step of positioning the rotor head so as to face a direction of the lightning.

* * * * *